United States Patent
Chang et al.

(10) Patent No.: US 9,372,816 B2
(45) Date of Patent: Jun. 21, 2016

(54) ADVANCED PROGRAMMABLE INTERRUPT CONTROLLER IDENTIFIER (APIC ID) ASSIGNMENT FOR A MULTI-CORE PROCESSING UNIT

(75) Inventors: Steven S. Chang, San Jose, CA (US); Anshuman Thakur, Beaverton, OR (US); Ramacharan Sundararaman, Hillsboro, OR (US); Ramon Matas, Portland, OR (US); Jay S. Lawlor, Hillsboro, OR (US); Robert F. Netting, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 13/994,104

(22) PCT Filed: Dec. 29, 2011

(86) PCT No.: PCT/US2011/067895
§ 371 (c)(1),
(2), (4) Date: Jun. 13, 2013

(87) PCT Pub. No.: WO2013/101091
PCT Pub. Date: Jul. 4, 2013

(65) Prior Publication Data
US 2014/0156896 A1 Jun. 5, 2014

(51) Int. Cl.
G06F 13/00 (2006.01)
G06F 13/24 (2006.01)

(52) U.S. Cl.
CPC ...................................... *G06F 13/24* (2013.01)

(58) Field of Classification Search
USPC ........................ 710/104; 713/1, 100; 709/251
See application file for complete search history.

(56) References Cited

U.S. PATENT DOCUMENTS

| 5,307,353 | A  | * | 4/1994  | Yamashita et al. ............. 714/4.1 |
| 5,495,569 | A  | * | 2/1996  | Kotzur .............................. 714/2   |
| 5,841,444 | A  | * | 11/1998 | Mun et al. ..................... 345/506   |
| 6,018,782 | A  | * | 1/2000  | Hartmann ..................... 710/310      |
| 6,219,741 | B1 | * | 4/2001  | Pawlowski et al. ........... 710/260   |
| 6,430,700 | B1 | * | 8/2002  | Daruwalla et al. ............. 714/4.1 |
| 6,687,818 | B1 | * | 2/2004  | Svenkeson et al. ............... 713/2 |
| 6,983,405 | B1 | * | 1/2006  | Herron et al. ................. 714/726 |

(Continued)

FOREIGN PATENT DOCUMENTS

WO  WO 01-09719 A1  2/2001

OTHER PUBLICATIONS

Notification of Transmittal of the International Search Report and the Written Opinion or the International Searching Authority, or the Declaration for PCT Counterpart Application No. PCT/US2011/067895, 10 pgs., (Sep. 12, 2012).

(Continued)

*Primary Examiner* — Paul R Myers
(74) *Attorney, Agent, or Firm* — Nicholson De Vos Webster & Elliott LLP (57) ABSTRACT

Following a restart or a reboot of a system that includes a multi-core processor, the multi-core processor may assign each active and eligible core a unique advanced programmable interrupt controller (APIC) identifier (ID). Initialization logic may detect a state of each of the plurality of processing cores as active or inactive. The initialization logic may detect an attribute of each of the plurality of processing cores as eligible to be assigned an APIC ID or as ineligible to be assigned the APIC ID.

19 Claims, 8 Drawing Sheets

(56) References Cited

U.S. PATENT DOCUMENTS

| | | | |
|---|---|---|---|
| 7,085,847 B2* | 8/2006 | Darnell et al. | 709/232 |
| 7,328,270 B1* | 2/2008 | Reents et al. | 709/230 |
| 2003/0145194 A1* | 7/2003 | O'Shea et al. | 713/1 |
| 2003/0233492 A1 | 12/2003 | Schelling | |
| 2004/0158710 A1* | 8/2004 | Buer et al. | 713/160 |
| 2007/0067521 A1* | 3/2007 | Shen et al. | 710/104 |
| 2007/0118678 A1* | 5/2007 | Delano et al. | 710/316 |
| 2008/0120515 A1* | 5/2008 | Ritz et al. | 713/601 |
| 2008/0168255 A1 | 7/2008 | Abou-Emara et al. | |
| 2009/0168767 A1 | 7/2009 | Anders et al. | |
| 2011/0078299 A1* | 3/2011 | Nagapudi et al. | 709/223 |

OTHER PUBLICATIONS

PCT Notification concerning Transmittal of International Preliminary Report on Patentability (Chapter I of the Patent Cooperation Treaty) for PCT Counterpart Application No. PCT/US2011/067895, 6 pgs., (Jul. 1, 2014).

Office action and Search Report with English translation of Search Report from Taiwan Patent Application No. 101148339, mailed Aug. 4, 2014, 18 pages.

Notice of Allowance from Taiwan Patent Application No. 101148339, mailed Nov. 28, 2014, 2 pages.

\* cited by examiner

ADVANCED PROGRAMMABLE INTERRUPT CONTROLLER IDENTIFIER (APIC ID) ASSIGNMENT FOR A MULTI-CORE PROCESSING UNIT

CROSS-REFERENCE TO RELATED APPLICATION

This patent application is a U.S. National Phase Application under 35 U.S.C. §371 of International Application No. PCT/US2011/067895, filed Dec. 29, 2011, entitled ADVANCED PROGRAMMABLE INTERRUPT CONTROLLER IDENTIFIER (APIC ID) ASSIGNMENT FOR A MULTI-CORE PROCESSING UNIT.

TECHNICAL FIELD

This disclosure relates generally to the field of microprocessors. In particular, this disclosure relates to assignment of an advanced programmable interrupt controller identifier (APIC ID) to a processing core of a multi-core processing unit.

BACKGROUND ART

Until recently, computing devices typically included a single processing unit for each socket available on the computing device's main circuit board. More recently, the single processing unit has been improved to include multiple cores, which enable the processor to execute instructions in parallel using the various cores. An ability to include additional processors or cores on a chip becomes more readily available as the footprint of the cores continues to decrease through advancements in manufacturing.

The inclusion of many cores on a chip, termed "system on a chip" or "SOC", where the SOC is accessible to the computing device through a socket, may present some new challenges to both hardware and software architects. One challenge is that the additional cores should be accessible by the socket with minimized communication paths that link the cores, thereby saving valuable space on the chip for additional cores or other necessary components. These challenges are further complicated when the availability of the cores may change during an operational life of the SOC.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to assignment of an advanced programmable interrupt controller (APIC) identifier (ID) to one or more processing cores in a multi-core processor. The multi-core processor may include many cores, which may be central processing units (CPUs), graphical processing units (GPUs), general processing graphical processing units (GPGPUs), other processing logic, or a combination thereof. The various cores may be in communication with each other and/or an initialization core via an interconnect. The interconnect may be arranged as a mesh interconnect, a shared interconnect, a peer-to-peer (P2P) interconnect, or a ring interconnect.

Following a restart or a reboot of a system that includes the multi-core processor, the multi-core processor may assign active and eligible cores unique instances of APIC IDs, thus each active and eligible core may receive a different APIC ID. In accordance with at least some embodiments, initialization logic may detect a state of each of the plurality of processing cores as active or inactive. Cores that are inactive may be deactivated for various reasons such as due to a malfunction of the core or for other reasons. The initialization logic may detect an attribute of each of the plurality of processing cores as eligible to be assigned an APIC ID or as ineligible to be assigned the APIC ID. After assignment of the APIC IDs, an initialization core or other core may expose the APIC ID assignments to external software.

The techniques, apparatuses, and systems described herein may be implemented in a number of ways. Example implementations are provided below with reference to the following figures.

Illustrative Environment

Figure 1:
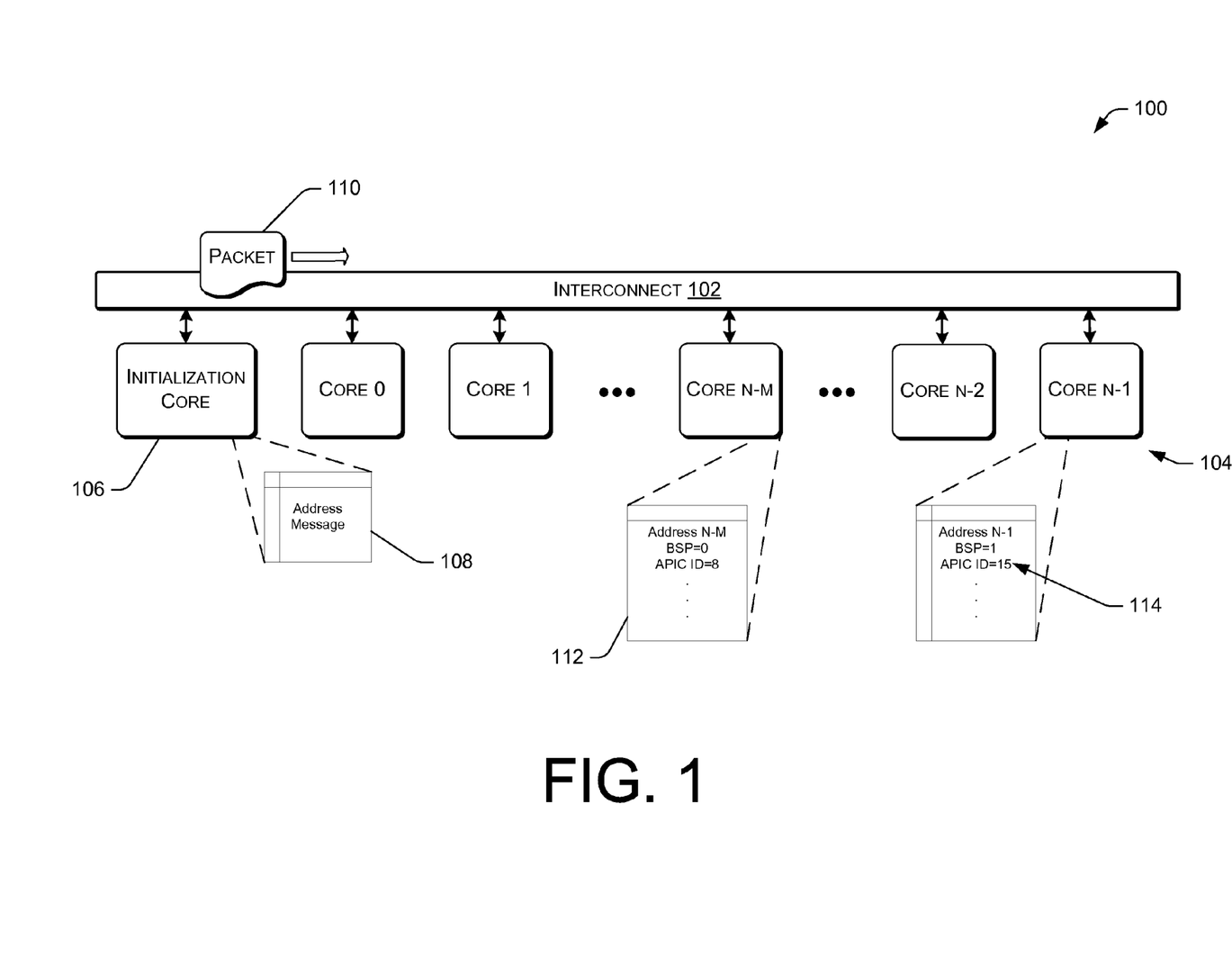
FIG. 1 is a schematic diagram of an illustrative multi-core processing unit that uses an interconnect to facilitate communication between the cores.

FIG. 1 is a schematic diagram of an illustrative multi-core processing unit 100 that uses an interconnect 102 to facilitate communication between the cores. In various embodiments, the multi-core processing unit 100 (or processor) may include a plurality of cores 104, which may be central processing units (CPUs), graphical processing units (GPUs), general processing graphical processing units (GPGPUs), other processing logic, or a combination thereof.

Figure 2:
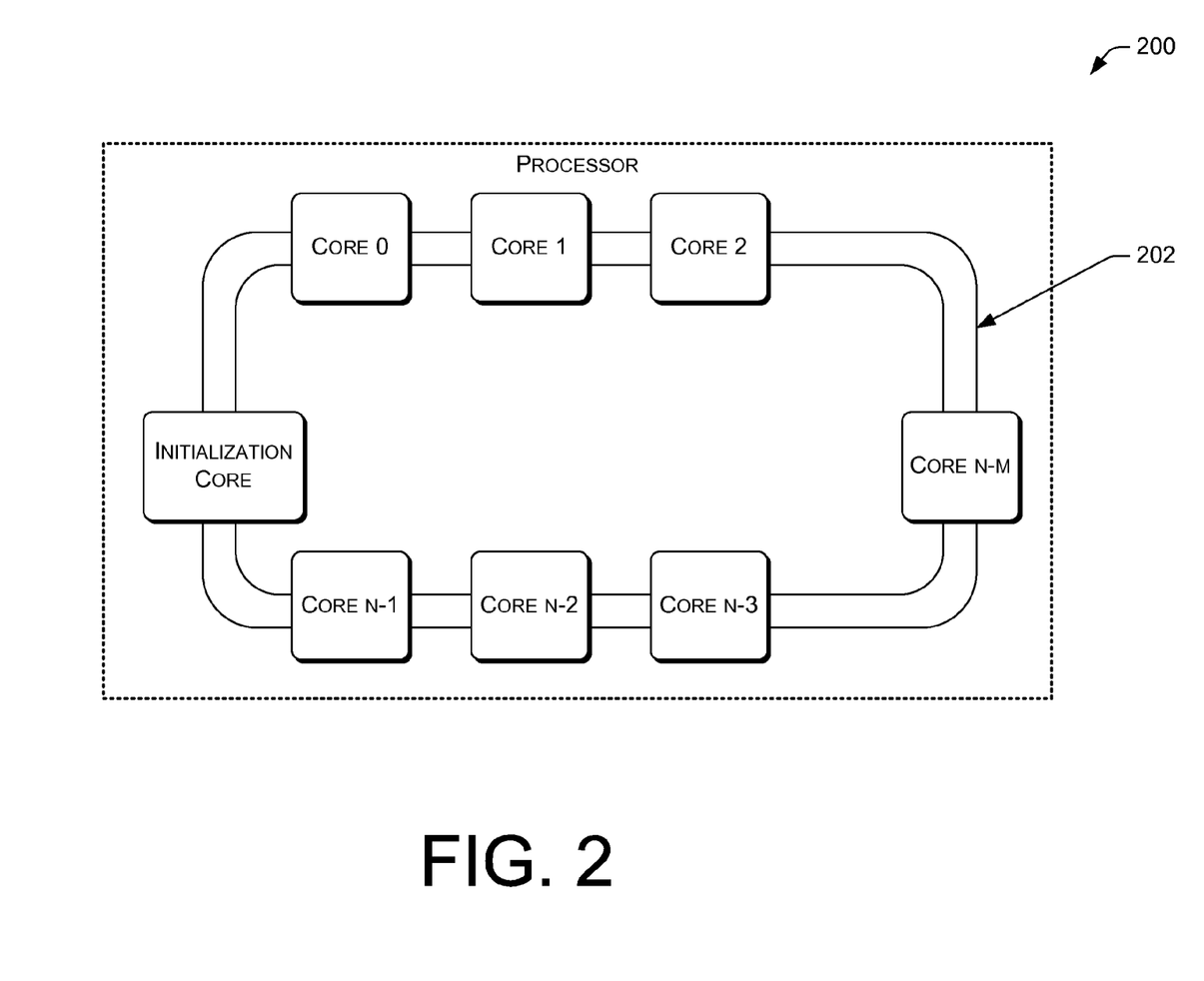
FIG. 2 is a schematic diagram of an illustrative multi-core processing unit that uses an interconnect arranged as a ring structure.
Figure 3:
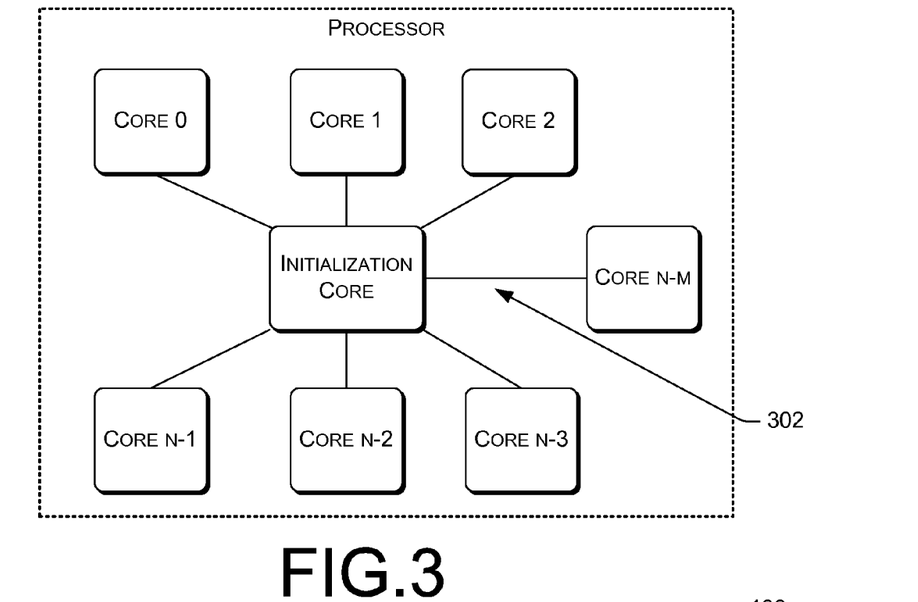
FIG. 3 is a schematic diagram of an illustrative multi-core processing unit that uses an interconnect arranged as a mesh.
Figure 4:
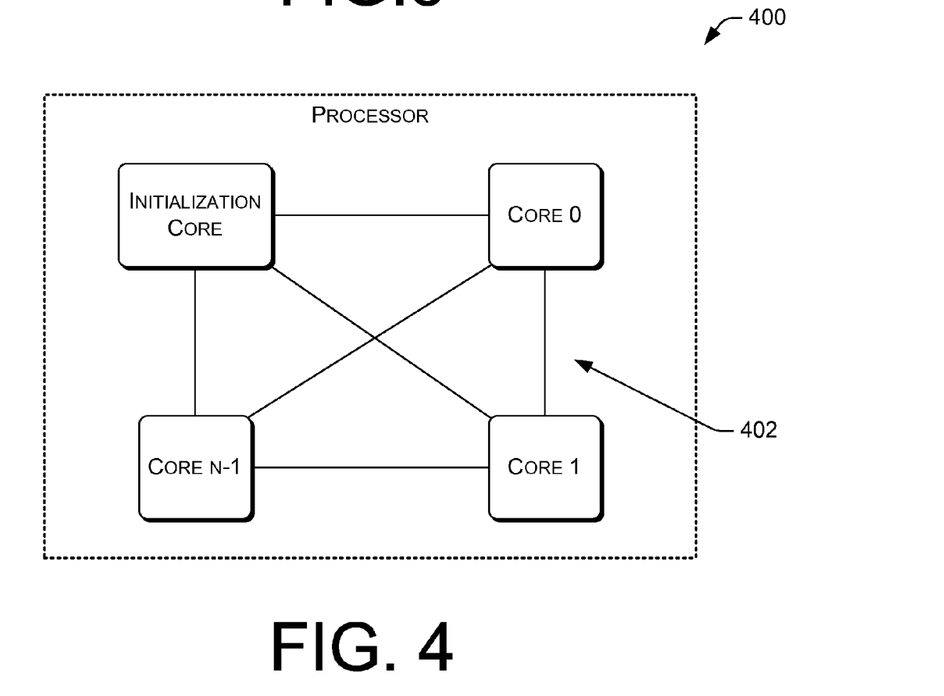
FIG. 4 is a schematic diagram of an illustrative multi-core processing unit that uses an interconnect arranged in a peer-to-peer configuration.

In accordance with the some embodiments, the various cores may be in communication with each other and/or an initialization core 106 via the interconnect 102. In accordance with various embodiments, the interconnect 102 may be arranged as a shared interconnect as shown in FIG. 1, as a ring interconnect as shown in FIG. 2, as a mesh interconnect as shown in FIG. 3, or as a peer-to-peer (P2P) interconnect as shown in FIG. 4.

The initialization core 106 may be a processor core that includes initialization logic 108. The initialization logic 108 may be used to transmit information to one or more of the plurality of cores through use of a packet 110. The initialization logic may be implemented following a reboot or a reset of the processing unit 100. For example, when the processing unit 100 is reset or rebooted, then the initialization logic may perform a number of operations before the plurality of cores may begin to process external software, such as software run by applications through an operating system.

In accordance with at least some embodiments, the initialization logic 108 may detect a state of each of the plurality of processing cores as active or inactive. Cores that are inactive may be deactivated for various reasons such as due to a malfunction of the core or for other reasons. For example, after deployment of the processing unit 100, one or more of the plurality of cores 104 may fail or otherwise need to be deactivated. After a core is deactivated, any essential operations performed by the deactivated core may need to be assigned to another core. Thus, the initialization logic 108 may reassign some operations performed by a core that was active, but has been deactivated, to other cores that are still active.

In various embodiments, the initialization logic 108 may detect attributes 112 of each of the plurality of processing cores. One of the attributes 112 may indicate that the core is eligible to be assigned an APIC ID or is ineligible to be assigned the APIC ID. The attributes 112 may include data associated with the particular processing cores, which may include without limitation, an address of the processing core, a status, an eligibility of the processing core to include the APIC ID, and other data. The core may read and write information to or from the attributes. The information may be provided in some instances from the packet 110, which may be transmitted between the processing core and the initialization core 106, possibly through other cores or directly from the initialization core.

In various embodiments, the packet 110 may include initialization information that is generated from the initialization logic 108 by the initialization core 106. The packet 110 may include an address of a recipient core, such as the core N-M or another core. In some embodiments, the packet may include multiple addresses of different cores, where the cores may have different information to be transmitted to the respective cores or the cores may have the same information to be transmitted to the respective cores. When the packet 110 is received by a core having the address specified by the packet, the core may read at least a portion of the contents of the packet that applies to the core. In some embodiments, a core may read a designation for the core to assign the APIC ID. In response to reading that the core is to be assigned the APIC ID, the core may update an attribute to store a designation or indication of the APIC ID, such as a designation 114.

After assignment of the APIC IDs, the initialization core 106 or other core may expose the APIC ID assignments to external software. Accordingly, the external software may use the APIC IDs to interact with the respective cores.

FIG. 2 is a schematic diagram of an illustrative multi-core processing unit 200 that uses an interconnect arranged as a ring structure 202. The ring structure 202 may accommodate an exchange of the packet 110 between the initialization core and the other cores or between any combinations of the cores.

FIG. 3 is a schematic diagram of an illustrative multi-core processing unit 300 that uses an interconnect arranged as a mesh 302. The mesh 302 may accommodate an exchange of the packet 110 between the initialization core and the other cores or between any combinations of the cores.

FIG. 4 is a schematic diagram of an illustrative multi-core processing unit 400 that uses an interconnect arranged in a peer-to-peer configuration 402. The peer-to-peer configuration 402 may accommodate an exchange of the packet 110 between the initialization core and the other cores or between any combinations of the cores.

Illustrative Operation

Figure 5:
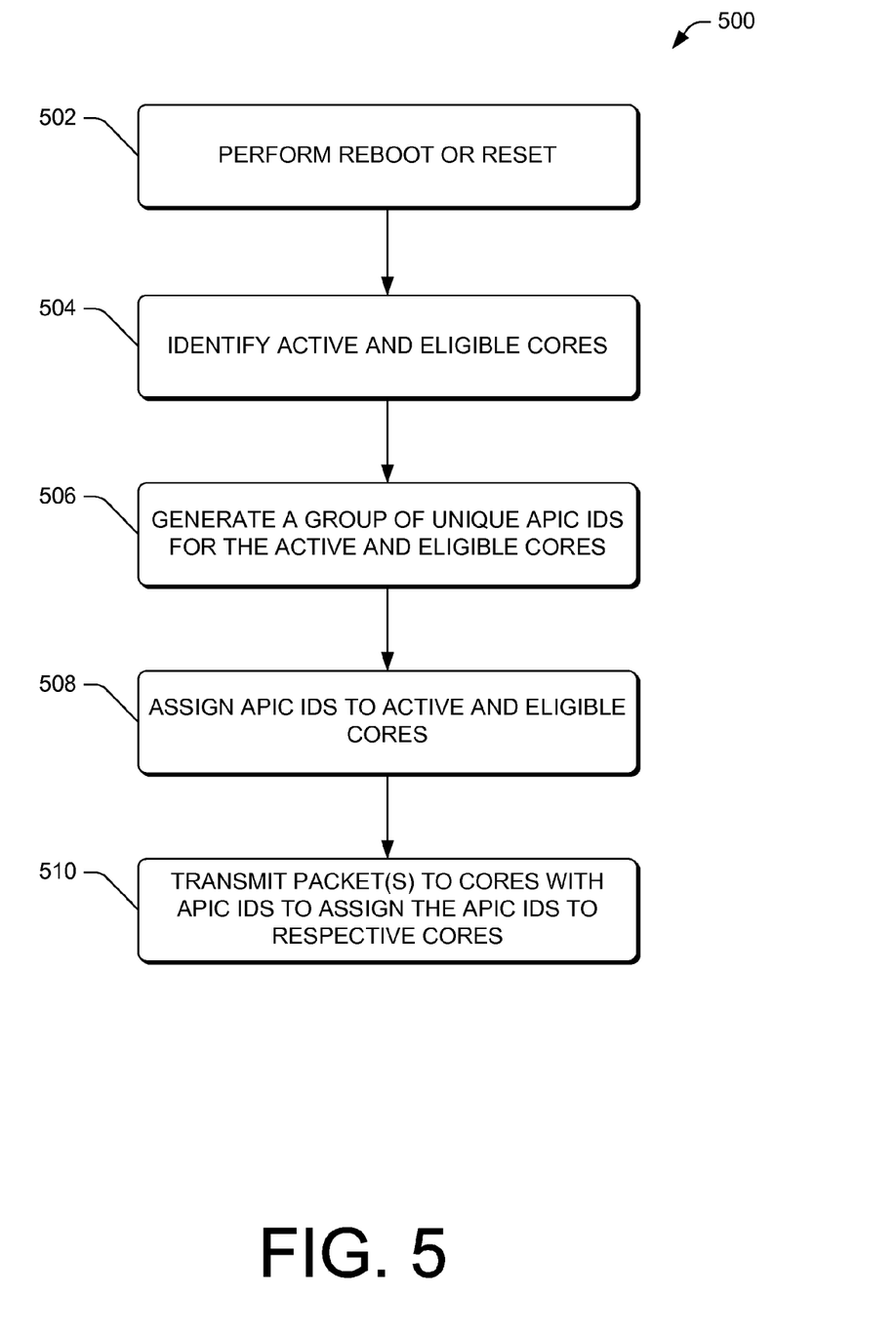
FIG. 5 is a flow diagram of an illustrative process to assign an advanced programmable interrupt controller (APIC) identifier (ID) to active and eligible cores.
Figure 6:
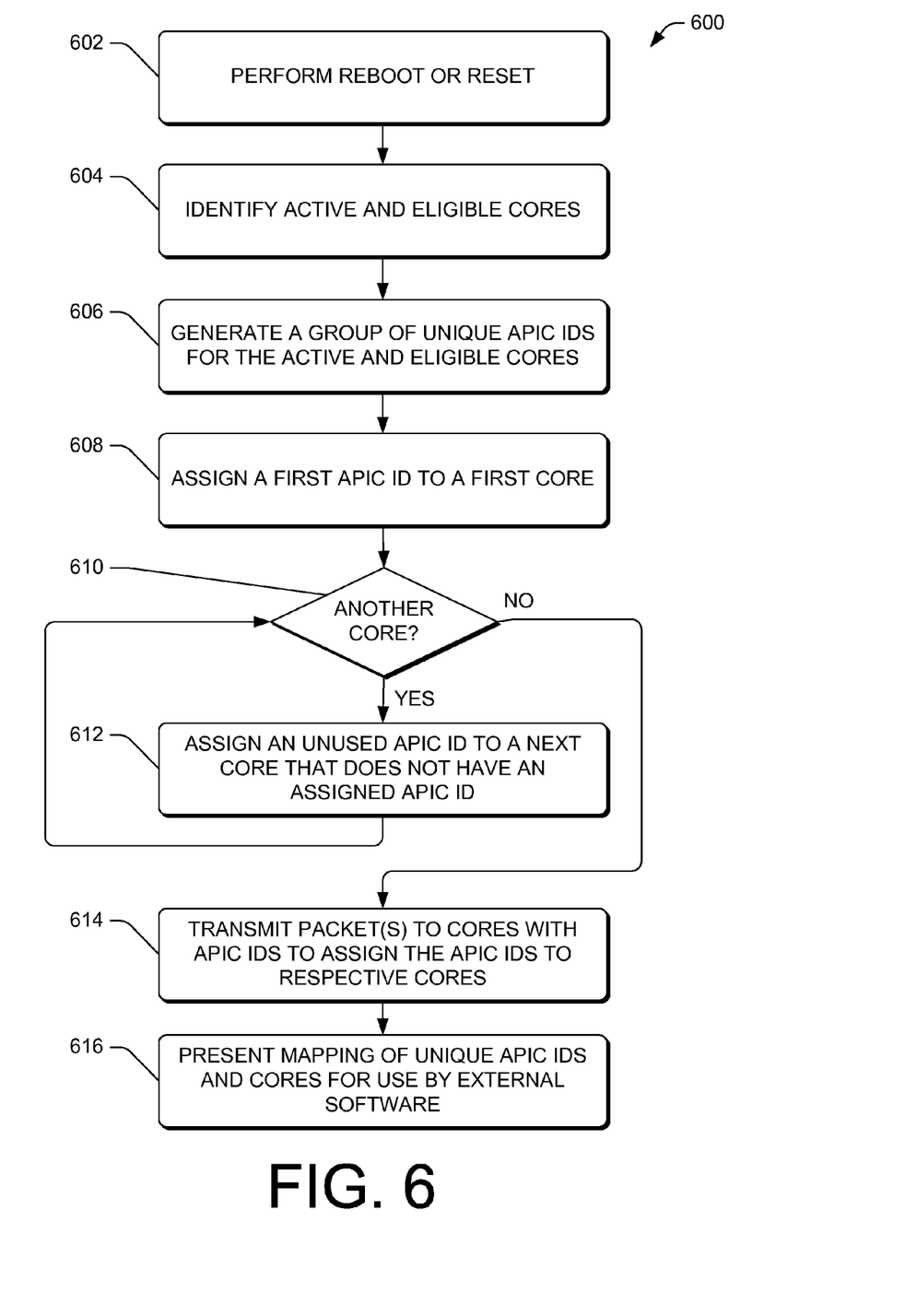
FIG. 6 is a flow diagram of another illustrative process to assign an APIC ID to active and eligible cores.

FIGS. 5 and 6 show illustrative processes to perform assignment of the APIC IDs to cores in a multi-core processor. The processes are illustrated as a collection of blocks in a logical flow graph, which represent a sequence of operations that can be implemented in hardware, software, or a combination thereof. The order in which the operations are described is not intended to be construed as a limitation, and any number of the described blocks can be combined in any order and/or in parallel to implement the processes. The processes are described with reference to the environment 100. Of course, the processes may be performed in other similar and/or different environments.

FIG. 5 is a flow diagram of an illustrative process 500 to assign an APIC ID to active and eligible cores.

At 502, the processing unit 100 may perform a reboot or a reset. The reboot or the reset may, in some instances, follow deactivation of one or more of a plurality of processing cores. The cores may be deactivated by a system administrator, by a user, or by instructions executed by the processing unit 100.

At 504, the initialization logic may detect the active and eligible core of the plurality of processing cores. The initialization logic may exchange or attempt to exchange a packet with the plurality of processing cores to determine a state of the cores as active or inactive and as eligible to include an APIC ID or ineligible to include the APIC ID. For example, the initialization logic may determine that cores that are unresponsive to a request included in the packet are inactive cores. Some cores may be designated as ineligible to include the APIC ID because of limited capacity, functionality, or other characteristics of these cores. The attributes of these cores may include an indication that these cores are ineligible to include the APIC ID. In some embodiments, the initialization logic may store an indication of cores that are eligible to include the APIC ID and/or an indication of cores that are ineligible to include the APIC ID. Thus, at 504, the initialization logic may detect which active cores are also eligible to include the APIC ID.

At 506, the initialization logic may generate a group of unique APIC IDs that enables assignment of a unique APIC ID to each of the active and eligible cores identified at the operation 504.

At 508, the initialization core may assign the APIC IDs to the active and eligible cores. The initialization core may perform the assignment via the initiation logic by including the assignment in the initialization information in a packet.

At 510, the initialization core may transmit the packet to the active and eligible cores. Upon receipt of the packet, the active and eligible cores may read a message, which may cause the core to read or write data, or otherwise execute an instruction. The core may perform a write action to assign or record the unique APIC ID to the particular core. Upon completion, each active and eligible core will receive a different APIC ID which uniquely addresses the respective core to enable external software to provide instructions to specific cores in accordance with the APIC IDs. Thus, the APIC ID assignments may be made available to external software to enable control and assignment of executions by the cores.

FIG. 6 is a flow diagram of another illustrative process 600 to assign an APIC ID to active and eligible cores.

At 602, the processing unit 100 may perform a reboot or reset. The reboot or reset may, in some instances, follow deactivation of one or more of a plurality of processing cores.

At 604, the initialization logic may detect the active and eligible core of the plurality of processing cores. The initialization logic may exchange or attempt to exchange a packet with the plurality of processing cores to determine a state of the cores as active or inactive and as eligible to include an APIC ID or ineligible to include the APIC ID. The attributes of these cores may include an indication that these cores are ineligible to include the APIC ID. In some embodiments, the initialization logic may store an indication of cores that are eligible to include the APIC ID and/or an indication of cores that are ineligible to include the APIC ID.

At 606, the initialization logic may generate a group of unique APIC IDs that enables assignment of a unique APIC ID to each of the active and eligible cores identified at the operation 204.

At 608, the initialization core may assign a first APIC ID to a first active and eligible core. The first APIC ID may be a lowest APIC ID of the group of APIC IDs. The first active and eligible core may be the first core to receive a packet from the initialization core, such as a closest core to the initialization core or a core having another attribute that causes a selection of the core.

At 610, the initialization core may determine whether additional cores need to be assigned an APIC ID. When additional cores need an APIC ID assignment (following the "yes" route from the decision operation 610), then the initialization core may assign a next APIC ID that is different than any previously assigned APIC IDs to the next core at 612. The process 600 may loop back to the decision operation 610 until each of the cores is assigned a unique APIC ID. When no additional cores need an APIC ID assignment (following the "no" route from the decision operation 610), then the process may proceed to an operation 614. The initialization core may perform the assignment via the initiation logic by including the assignment in the initialization information in a packet.

At 614, the initialization core may transmit the packet to the active and eligible cores. Upon receipt of the packet, the active and eligible cores may read a message, which may cause the core to read or write data, or otherwise execute an instruction. The core may perform a write action to assign or record the unique APIC ID to the particular core. Upon completion, each active and eligible core will receive a different APIC ID which uniquely addresses the respective core to enable external software to provide instructions to specific cores in accordance with the APIC IDs.

At 616, the initialization core may present a mapping of the unique APIC IDs and respective cores for use by external software. Thus, the APIC ID assignments may be made available to external software to enable control and assignment of executions by the cores.

Figure 7:
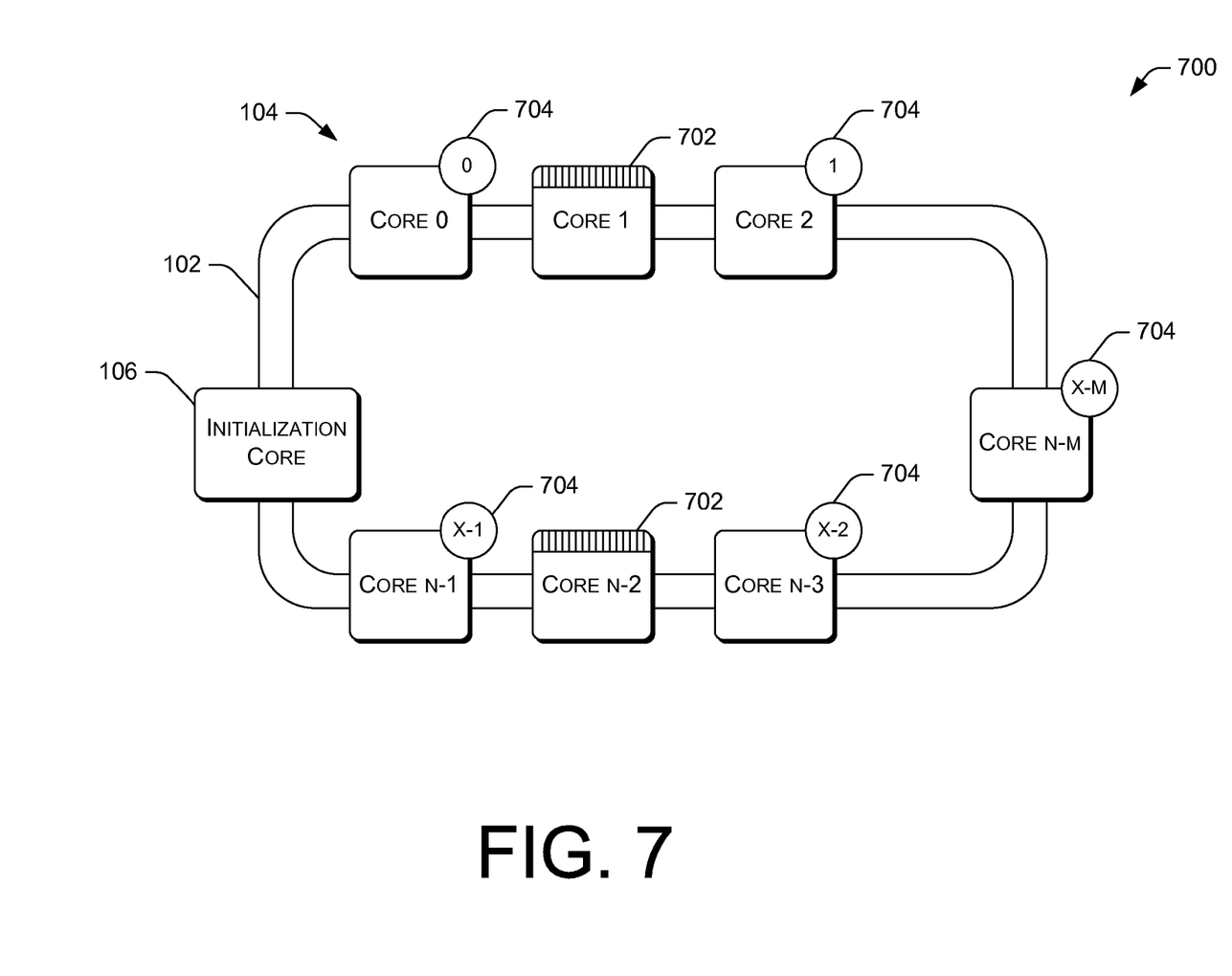
FIG. 7 is a schematic diagram of a multi-core processing unit that assigns an APIC ID to active and eligible cores.

FIG. 7 is a schematic diagram of a multi-core processing unit 700 that assigns an APIC ID to active and eligible cores. The multi-core processing unit 700 includes the initialization core 106 and the plurality of cores 106 in communication using the interconnect 102. Some cores 702 (one or more) of the plurality of the cores may be designated as ineligible to include the APIC ID, which is indicated in FIG. 7 by crosshatching. These cores may be designated as ineligible to include the APIC ID because of limited capacity, functionality, or other characteristics of these cores.

When the process 500 or the process 600 is applied to the multi-core processing unit 700 via the initialization logic, the processes may determine that the cores 0, 2, N-M, N-3, and N-1 are all active cores and also eligible to be assigned an APIC ID. The processes may assign APIC IDS 704 to each of the cores. The assignment may cause each of the active and eligible cores to have a unique APIC ID.

In some instances, the APIC IDs may be assigned from a lowest APIC ID to a highest APIC ID. In various instances, the APIC IDs may include a same increment, such as being whole numbers that increment a same value for the next APIC ID (e.g., 0, 1, 2, 3, . . . , etc.).

Figure 8:
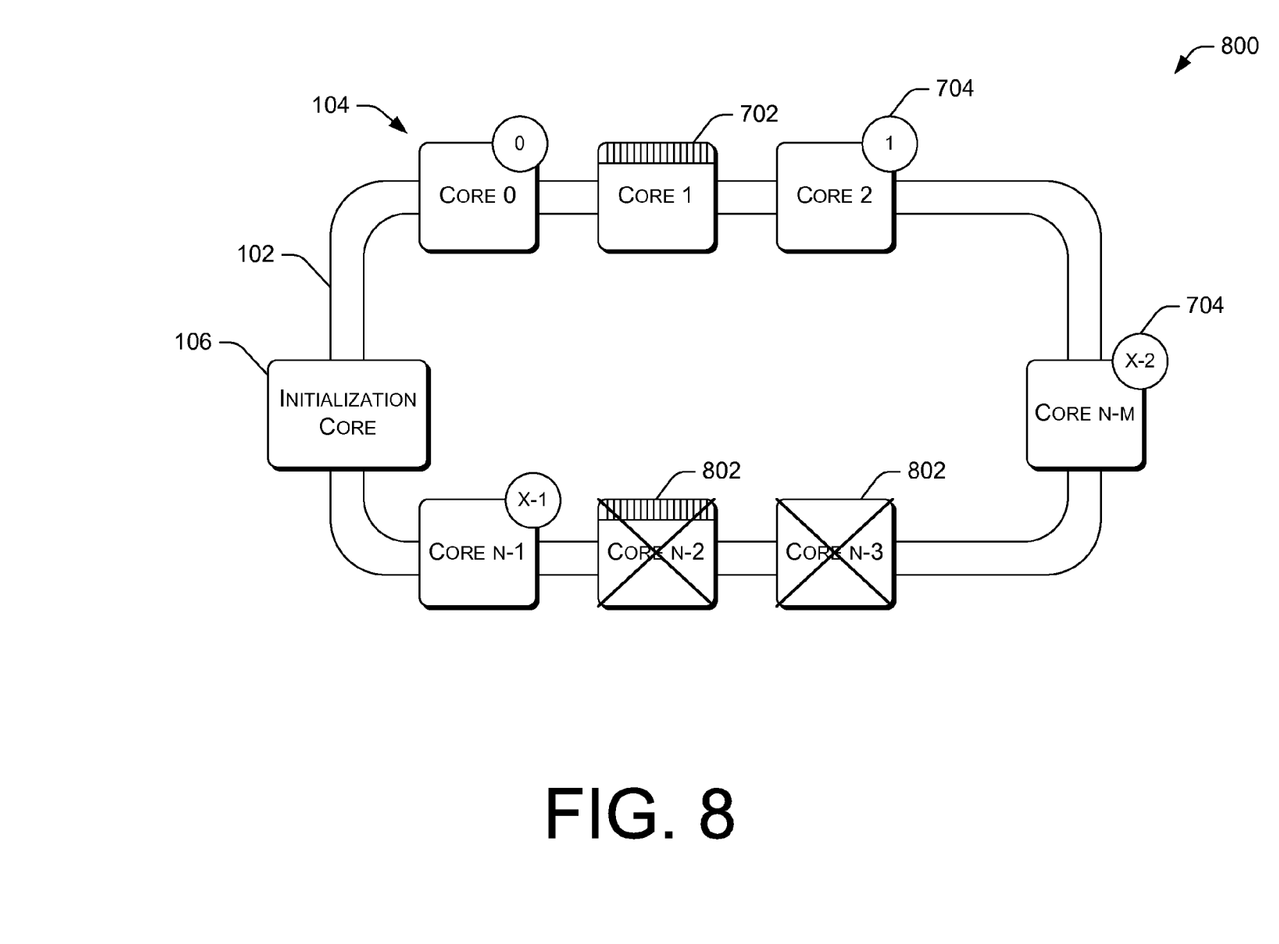
FIG. 8 is a schematic diagram of a multi-core processing unit that includes inactive cores and that assigns an APIC ID to active and eligible cores.

FIG. 8 is a schematic diagram of a multi-core processing unit 800 that includes inactive cores and that assigns an APIC ID to active and eligible cores. In the multi-core processing unit 800, core n-3 and core n-2 are shown as being inactive cores 802. Core n-3 and core n-2 may have been deactivated by an administrator, a user, and/or by instructions executed by the multi-core processing unit 800. Some cores 702 (one or more) of the plurality of the cores may be designated as ineligible to include the APIC ID, which is indicated in FIG. 8 by crosshatching. These cores may be designated as ineligible to include the APIC ID because of limited capacity, functionality, or other characteristics of these cores.

When the process 500 or the process 600 is applied to the multi-core processing unit 800 via the initialization logic, the processes may determine that the cores 0, 2, N-M, and N-1 are all active cores and also eligible to be assigned a unique APIC ID. In accordance with various embodiments, the processes may assign a unique APIC ID 704 to each of the active and eligible cores, which may be assigned by the initialization information in the packet.

Illustrative System

Figure 9:
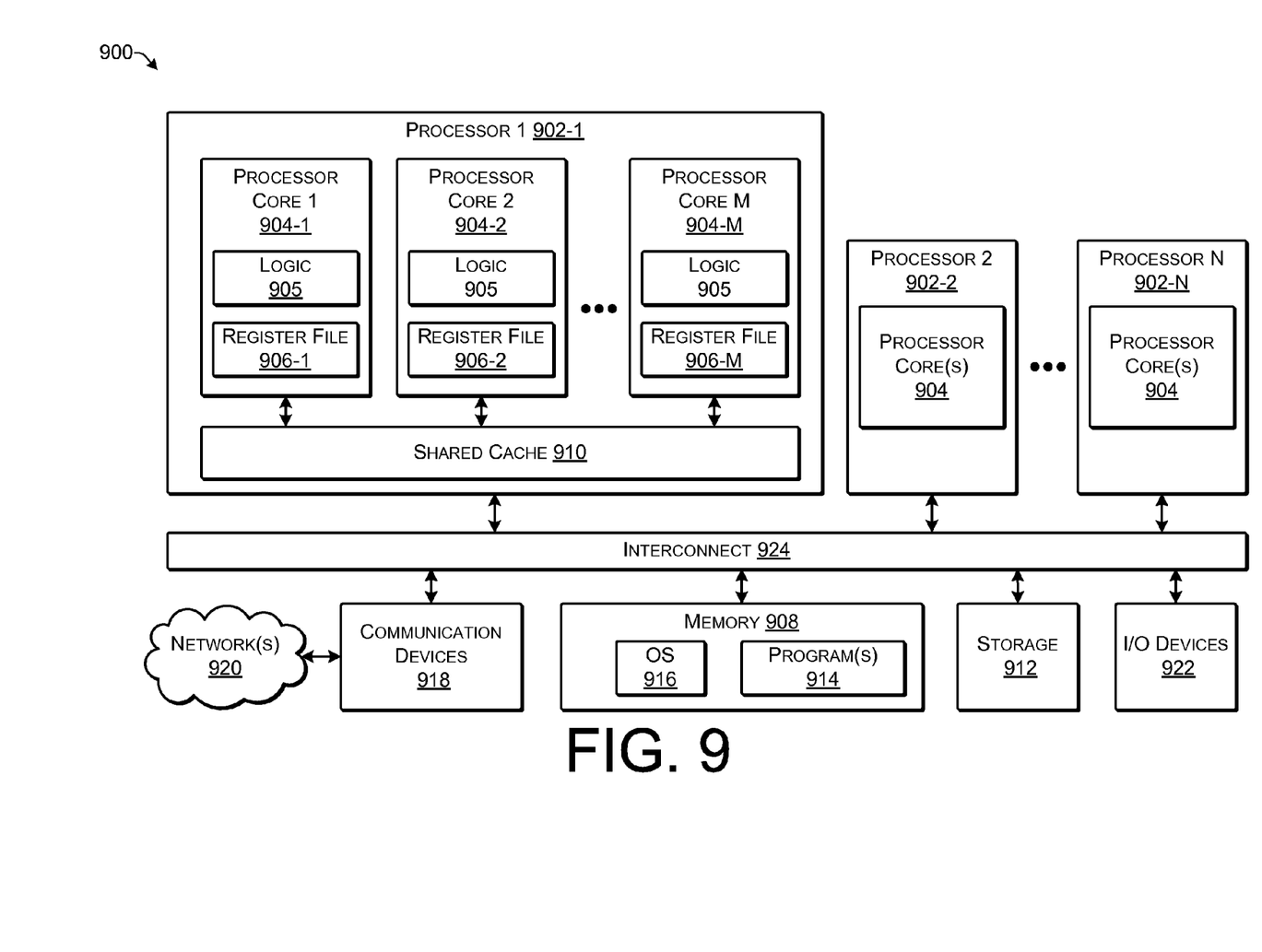
FIG. 9 is a block diagram of an illustrative system to perform assignment of an APIC ID to a core in a processor.

FIG. 9 illustrates nonlimiting select components of an illustrative system 900 according to some implementations herein that may include one or more instances of the processor architecture discussed above for implementing assignment of an APIC ID to a processor core in a multi-core processor. The system 900 may include one or more processors 902-1, 902-2, . . . , 902-N (where N is a positive integer ≥1), each of which may include one or more processor cores 904-1, 904-2, . . . , 904-M (where M is a positive integer ≥1). In some implementations, as discussed above, the processor(s) 902 may be a single core processor, while in other implementations, the processor(s) 902 may have a large number of processor cores, each of which may include some or all of the components illustrated in FIG. 9. For example, each processor core 904-1, 904-2, . . . , 904-M may include an instance of logic 905 to perform various tasks for that respective processor core 904-1, 904-2, . . . , 904-M. The logic 905 may include one or more of dedicated circuits, logic units, microcode, or the like.

The processor(s) 902 and processor core(s) 904 can be operated to fetch and execute computer-readable instructions stored in a memory 908 or other computer-readable media. The memory 908 may include volatile and nonvolatile memory and/or removable and non-removable media implemented in any type of technology for storage of information, such as computer-readable instructions, data structures, program modules or other data. Such memory may include, but is not limited to, RAM, ROM, EEPROM, flash memory or other memory technology. In the case in which there are multiple processor cores 904, in some implementations, the multiple processor cores 904 may share a shared cache 910. Additionally, storage 912 may be provided for storing data, code, programs, logs, and the like. The storage 912 may include solid state storage, magnetic disk storage, RAID storage systems, storage arrays, network attached storage, storage area networks, cloud storage, CD-ROM, digital versatile disks (DVD) or other optical storage, magnetic cassettes, magnetic tape, or any other medium which can be used to store desired information and which can be accessed by a computing device. Depending on the configuration of the system 900, the memory 908 and/or the storage 912 may be a type of computer readable storage media and may be a non-transitory media.

The memory 908 may store functional components that are executable by the processor(s) 902. In some implementations, these functional components comprise instructions or programs 914 that are executable by the processor(s) 902. The example functional components illustrated in FIG. 9 further include an operating system (OS) 916 to mange operation of the system 900.

The system 900 may include one or more communication devices 918 that may include one or more interfaces and hardware components for enabling communication with various other devices over a communication link, such as one or more networks 920. For example, communication devices 918 may facilitate communication through one or more of the Internet, cable networks, cellular networks, wireless networks (e.g., Wi-Fi, cellular) and wired networks. Components used for communication can depend at least in part upon the type of network and/or environment selected. Protocols and components for communicating via such networks are well known and will not be discussed herein in detail.

The system 900 may further be equipped with various input/output (I/O) devices 922. Such I/O devices 922 may include a display, various user interface controls (e.g., buttons, joystick, keyboard, touch screen, etc.), audio speakers, connection ports and so forth. An interconnect 924, which may include a system bus, point-to-point interfaces, a chipset, or other suitable connections and components, may be provided to enable communication between the processors 902, the memory 908, the storage 912, the communication devices 918, and the I/O devices 922.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A processor comprising:
a plurality of processing cores;
an interconnect coupled to the plurality of processing cores;
a first logic to assign unique advanced programmable interrupt controller (APIC) identifiers (IDs) to ones of the plurality of processing cores, wherein the assignment is to be formatted into a packet and transmitted on the interconnect;
a second logic to detect a state of each of the plurality of processing cores as active or inactive; and
a third logic to detect an attribute of each of the plurality of processing cores as eligible to be assigned as the APIC ID or as ineligible to be assigned as the APIC ID, wherein the first logic assigns the APIC ID to the ones of the plurality of processing cores that are active and eligible.

2. The processor as recited in claim 1, wherein the APIC IDs are assigned to the ones of the plurality of processing cores sequentially.

3. The processor as recited in claim 1, wherein the interconnect is arranged as a ring structure.

4. The processor as recited in claim 1, wherein the interconnect is a ring structure that includes a plurality of connections that enable transmission of packets of data to and from each of the plurality of processing cores.

5. The processor as recited in claim 1, wherein the first logic to assign the APIC IDs based at least in part on a location of each of the plurality of processing cores.

6. A processor comprising:
a plurality of processing cores;
an interconnect coupled to the plurality of processing cores; and
an initialization logic to
assign a unique advanced programmable interrupt controller (APIC) identifier (ID) to an active and eligible processing core of the plurality of processing cores by a transmission using the interconnect,
detect a state of each of the plurality of processing cores as active or inactive, and
detect an attribute of each of the plurality of processing cores as eligible to be assigned the APIC ID or as ineligible to be assigned as the APIC ID.

7. The processor as recited in claim 6, wherein the initialization logic to assign all active and eligible processing cores of the plurality of processing cores a unique instance of the APIC ID.

8. The processor as recited in claim 6, wherein an initialization logic to assign the APIC ID following a reset or reboot of the processor.

9. The processor as recited in claim 6, wherein the interconnect is arranged as a ring structure.

10. The processor as recited in claim 6, wherein the APIC ID is assigned a first value that is different than other instances of APIC IDs assigned to other ones of the plurality of processing cores.

11. The processor as recited in claim 6, wherein the processor further includes a socket to connect the processor with a corresponding socket on an electronic device.

12. A method, comprising:
detecting an active and eligible processing core from a plurality of processing cores; and
assigning, using a packet transmitted on an interconnect, the active and eligible processing core a unique advanced programmable interrupt controller (APIC) identifier (ID).

13. The method as recited in claim 12, further comprising transmitting the packet to the active and eligible processing core.

14. The method as recited in claim 13, further comprising reading the packet and storing the APIC ID.

15. The method as recited in claim 12, further comprising exposing the APIC ID to external software.

16. The method as recited in claim 12, wherein the detecting includes detecting a state of each of the plurality of processing cores as active or inactive.

17. The method as recited in claim 12, wherein the detecting includes detecting an attribute of each of the plurality of processing cores as eligible to be assigned the APIC ID or as ineligible to be assigned the APIC ID.

18. The method as recited in claim 12, further comprising performing a reboot or a reset of a system that includes the plurality of processing cores prior to the assigning the active and eligible processing core the unique APIC ID.

19. A processor comprising:
a plurality of processing cores;
an interconnect coupled to the plurality of processing cores;
a first logic to assign unique identifiers (IDs) to ones of the plurality of processing cores, wherein the assignment is to be formatted into a packet and transmitted on the interconnect;

a second logic to detect a state of each of the plurality of processing cores as active or inactive; and a third logic to detect an attribute of each of the plurality of processing cores as eligible to be assigned as the APIC ID or as ineligible to be assigned as the APIC ID, wherein the first logic assigns the APIC ID to the ones of the plurality of processing cores that are active and eligible.

* * * * *